(12) United States Patent
Quandt

(10) Patent No.: US 11,273,749 B2
(45) Date of Patent: Mar. 15, 2022

(54) BOAT TRAILER LATCH

(71) Applicant: Brandon Quandt, Orlando, FL (US)

(72) Inventor: Brandon Quandt, Orlando, FL (US)

( * ) Notice: Subject to any disclaimer, the term of this patent is extended or adjusted under 35 U.S.C. 154(b) by 79 days.

(21) Appl. No.: 16/861,797

(22) Filed: Apr. 29, 2020

(65) Prior Publication Data

US 2020/0346573 A1 Nov. 5, 2020

Related U.S. Application Data

(60) Provisional application No. 62/840,895, filed on Apr. 30, 2019.

(51) Int. Cl.
*B60P 3/10* (2006.01)
*B60P 7/08* (2006.01)

(52) U.S. Cl.
CPC ........... *B60P 3/1066* (2013.01); *B60P 7/0807* (2013.01); *B60P 7/0846* (2013.01)

(58) Field of Classification Search
CPC ...................................................... B60P 3/01
USPC ......... 410/2, 77, 69, 80, 81; 280/414.1, 216, 280/220, 433, 43, 6
See application file for complete search history.

(56) References Cited

U.S. PATENT DOCUMENTS

| | | | |
|---|---|---|---|
| 2,522,951 A * | 9/1950 | Knox | B60D 1/26 280/509 |
| 3,938,829 A | 2/1976 | Anderson | |
| 3,963,263 A | 6/1976 | Whitlock | |
| 4,641,598 A | 2/1987 | Hodges | |
| 4,693,164 A * | 9/1987 | Grinwald | F16B 45/021 89/1.13 |
| 5,599,035 A | 2/1997 | Spence | |
| 5,683,214 A * | 11/1997 | Jeffreys | B60P 3/1033 280/414.1 |
| 5,895,185 A | 4/1999 | Spence | |
| 6,598,896 B1 | 7/2003 | Hyslop | |
| 6,863,347 B2 * | 3/2005 | De Nichilo | B60N 2/22 297/361.1 |
| 8,607,418 B2 | 12/2013 | Ebbenga | |
| 9,340,141 B1 | 5/2016 | Downs | |
| 2003/0121675 A1 * | 7/2003 | Gingerich | A01B 59/006 172/274 |

* cited by examiner

*Primary Examiner* — D Glenn Dayoan
*Assistant Examiner* — Sunsurraye Westbrook
(74) *Attorney, Agent, or Firm* — Allen, Dyer et al.

(57) ABSTRACT

A boat trailer latch includes a top plate, a bottom plate, a V-notch formed in a front portion of the top and bottom plates, and a latching element having a tooth. The latching element is sandwiched between the top and bottom plates and configured to rotate through the V-notch. The latch also includes a pawl having a rounded notch configured to lock in the tooth of the latching element and prevent the latching element from rotating. The latching element is configured to rotate in a first direction in response to a boat bow hook entering the V-notch so that as the latching element continues to rotate in the first direction the latching element closes behind the boat bow hook, and the tooth of the latching element engages the notch of the pawl so that the latching element is prevented from rotating in a second opposing direction and releasing the bow hook.

20 Claims, 4 Drawing Sheets

BOAT TRAILER LATCH

RELATED APPLICATIONS

The present invention is related to U.S. Provisional Patent Application Ser. No. 62/840,895 filed Apr. 30, 2019, the entire contents of which are incorporated herein by reference.

FIELD

The present invention relates to the field of boat trailers, and, more particularly, to a boat trailer latch and related methods.

BACKGROUND

Boat trailers for transporting, launching and loading boats have been used for many years. Most boats are manufactured with a bow hook, which is generally as U-shaped bolt on the bow of the boat. The U-shaped bolt is positioned and intended to receive a strap (or hook) from a winch on the boat trailer. The winch is used to pull the boat on to the trailer when loading. Even if the winch is not needed to load the boat on to the trailer, the boat still needs to be secured to the trailer when pulling the boat and trailer out of the water in order to avoid the boat slipping off the trailer and causing significant damage.

Often times when loading a relatively large boat on the trailer, it is difficult to secure the strap to the U-shaped bolt due to a number of factors such as the boat ramp is steep making it difficult to reach that area of the trailer. In addition, if the boater is alone, the boater must drive the boat on the trailer then climb off the boat in order to secure the strap.

Accordingly, a need exists for a boat trailer latch that is easy to install on the trailer and also is easy to use to secure the winch strap from the trailer to the boat.

SUMMARY

In view of the foregoing background, it is therefore an object of the present invention to provide an improved boat trailer latch. This and other objects, features, and advantages in accordance with the present invention are provided by a boat trailer latch having a top plate, a bottom plate, a V-notch formed in a front portion of the top and bottom plates, and a latching element having a tooth. The latching element is sandwiched between the top and bottom plates and configured to rotate through the V-notch. The latch also includes a pawl having a rounded notch configured to lock in the tooth of the latching element and prevent the latching element from rotating, and a pair of brackets positioned on opposing sides of the top and bottom plates and the pair of brackets being adjustable forward or rearward relative to the V-notch.

The latching element is configured to rotate in a first direction in response to a boat bow hook entering the V-notch so that as the latching element continues to rotate in the first direction the latching element closes behind the bow hook, and the tooth of the latching element engages the notch of the pawl so that the latching element is prevented from rotating in a second opposing direction and releasing the bow hook.

In another aspect, a method of manufacturing a boat trailer latch for use with a boat trailer and boat strap is disclosed. The method includes providing a top plate having a front portion and a rear portion, securing a bottom plate having a front portion and a rear portion to the top plate, and rotatably coupling a latching element having a tooth between the top and bottom plates and configured to rotate through the V-notch. In addition, the method includes positioning a pawl having a notch in order to selectively lock in the tooth of the latching element and prevent the latching element from rotating, securing a pair of adjustable brackets on opposing sides of the top and bottom plates, and forming a V-notch in the front portions of the top and bottom plates.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
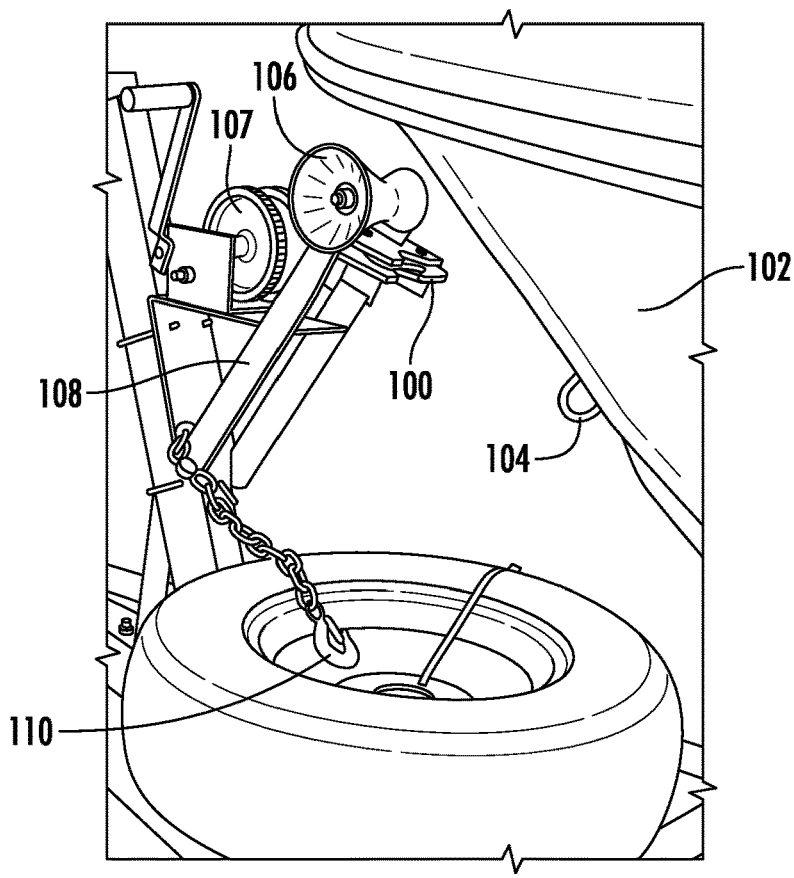
FIG. 1 is a perspective view of a boat trailer latch of the present invention installed on a boat trailer.

Referring initially to FIG. 1, a boat trailer latch (also referred to hereinafter as "latch") is shown and generally designated 100. The latch 100 is positioned so that as the bow of the boat 102 moves towards the trailer roller 106, the U-shaped bolt 104 (i.e., bow hook) will slide into the latch 100 and lock in place. The trailer roller 106 is mounted to arm 108 that extends upwards and in front of the boat winch 107.

Figure 2:
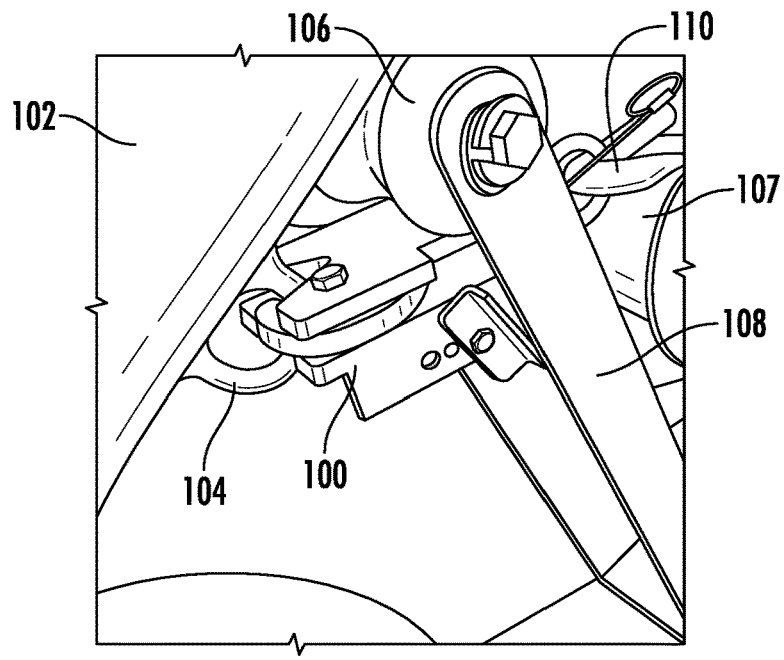
FIG. 2 is a detail front view of the boat trailer latch of FIG. 1 securing a boat to the boat trailer.
Figure 3:
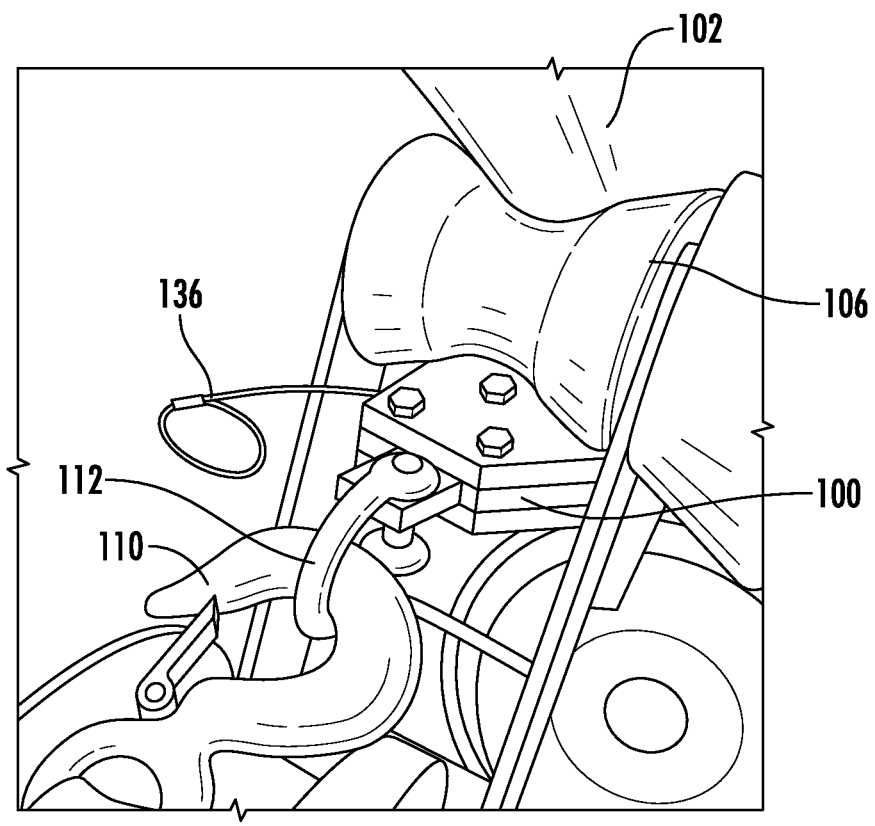
FIG. 3 is a detail rear view of the boat trailer latch of FIG. 2.

FIG. 2 is a detail front view of the U-shaped bolt 104 secured into the latch 100. A typical trailer strap has a clasp 110 on its end that is used to clip into the U-shaped bolt 104 secured to a bow of the boat 102 as shown in FIG. 3. Instead of the clasp 110 clipping to the U-shaped bolt 104 directly, the clasp 110 is clipped to a rear portion of the latch 100 having a ring 112.

Accordingly, installation of the latch 100 does not require bolting to the trailer itself. Rather, the clasp 110 is clipped into the ring 112 and the winch 107 of the boat trailer reels in the boat strap in order to tighten the latch 100 against the arm 108 of the trailer itself. This makes it quicker and easy to install the latch 100 to the trailer than using bolts because the latch 100 is secured to the trailer only by the boat strap. Therefore, the latch 100 can quickly be removed and used for another trailer by loosening the boat strap.

Figure 4:
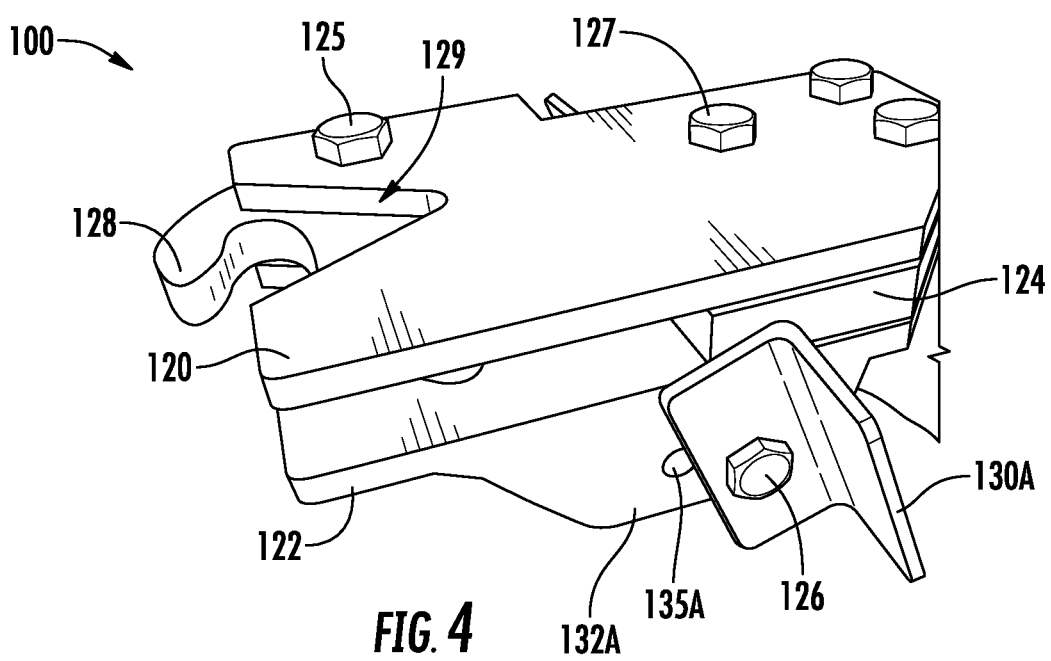
FIG. 4 is a right side perspective view of the boat trailer latch.

Referring now to FIG. 4, a perspective view of the latch 100 is shown. The latch 100 includes a top plate 120 and a bottom plate 122 and having a spacer 124 therebetween. The spacer 124 creates a space for latching element 128 that rotates about latching element pin 125. A front portion of the latch 100 has a V-notch 129 that is used to guide the U-shaped bolt 104 to a vertex of the V-shaped notch 129. A pawl 131 is used to lock the latching element 128 as the U-shaped bolt 104 enters the V-notch 129 and causes the latching element 128 to rotate about latching pin 127 and close behind the U-shaped bolt 104.

When the latching element 100 is first used for a particular boat trailer, some adjustment may be necessary for the U-shaped bolt 104 to engage with the latch 100. The adjustments can be made by adjusting a bracket 130a forward or rearward relative to the V-notch 129. The bracket 130A is secured to the bottom plate 122 via flange 132A. The flange 132A has a plurality of apertures 135 that are used to secured the bracket 130A thereto using bolt 126. Accordingly, by selecting a particular aperture 135 of the flange 132A, the bracket 130A can be adjusted. In addition, the bracket 130A is inclined relative the top and bottom plates 120, 122 so that the bracket 130A rests flush against the arm 108 and the V-notch 129 is substantially horizontal with respect to the boat trailer itself.

Figure 5:
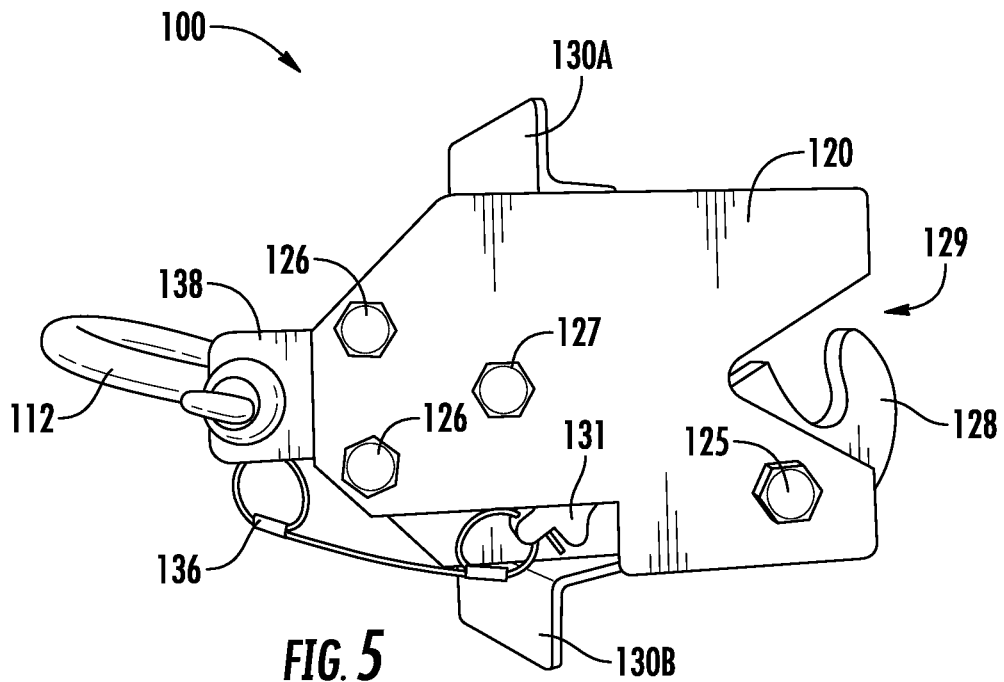
FIG. 5 is a top view of the boat trailer latch.

Referring now to FIG. 5, a top view of the latch 100 is shown. Bracket 130B is visible along with a portion of the pawl 131 and release 136 attached thereto. Bracket 130B is adjustable as described above with respect to bracket 130A. The incline/angle of the brackets 130A, 130B discussed above relative to the top plate 120 is clearly visible.

Figure 6:
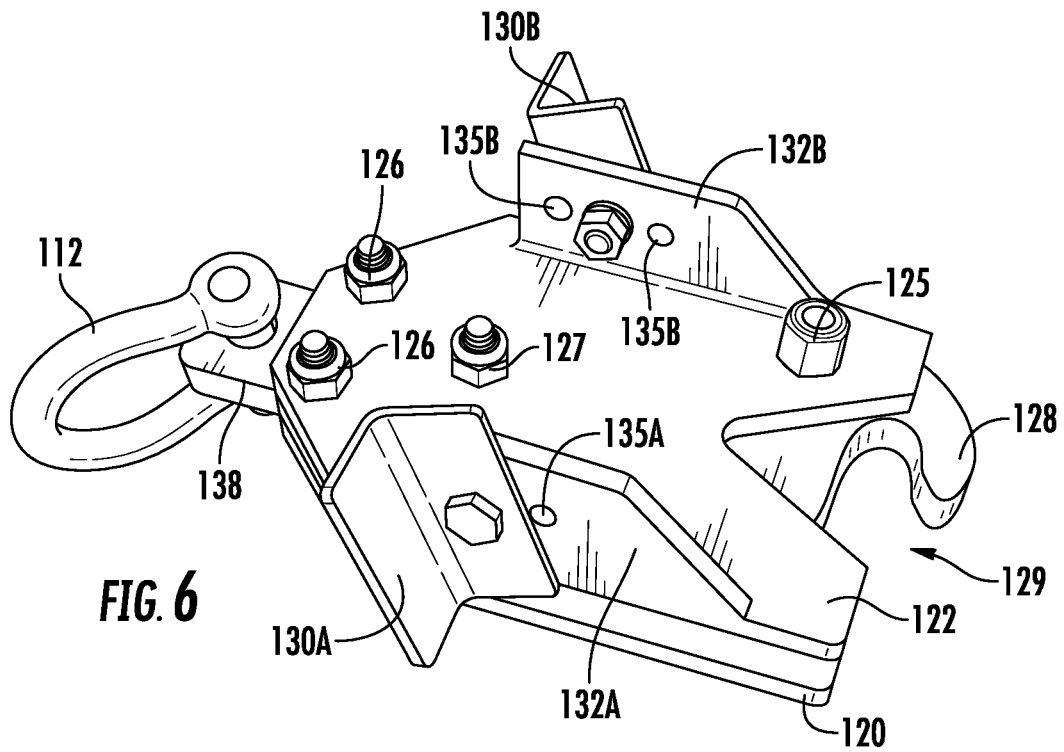
FIG. 6 is a bottom view of the boat trailer latch.

In FIG. 6, the respective apertures 135A, 135B of the flanges 132A, 132B are visible in a left side view of the latch 100.

Figure 7:
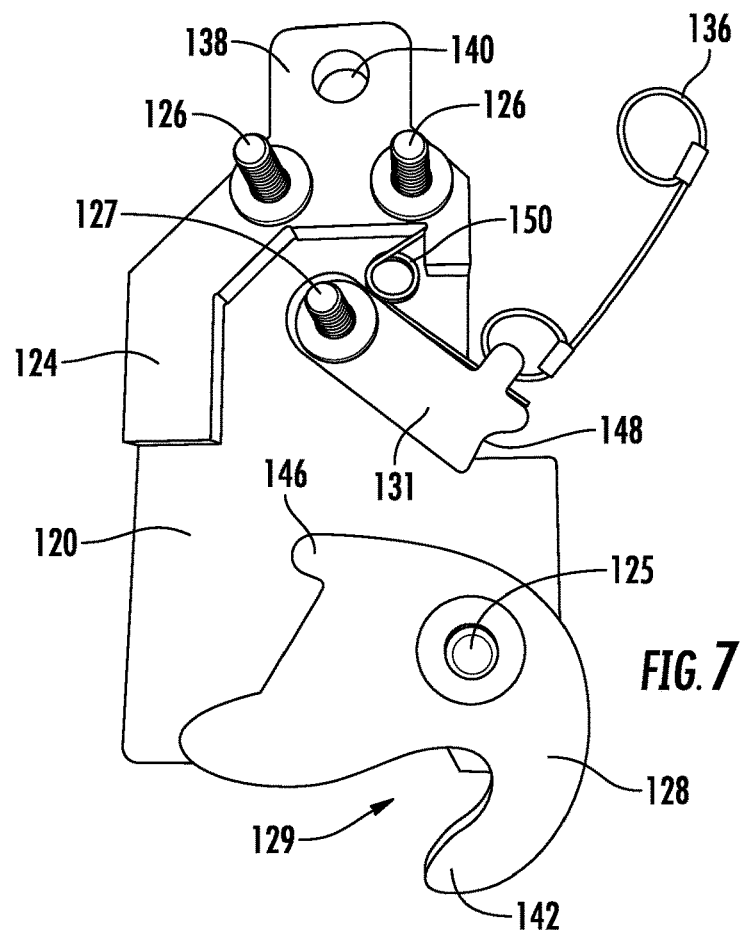
FIG. 7 is a view of the boat trailer latch with a bottom plate removed and in a position to receive a U-shaped bolt of a bow boat hook.
Figure 8:
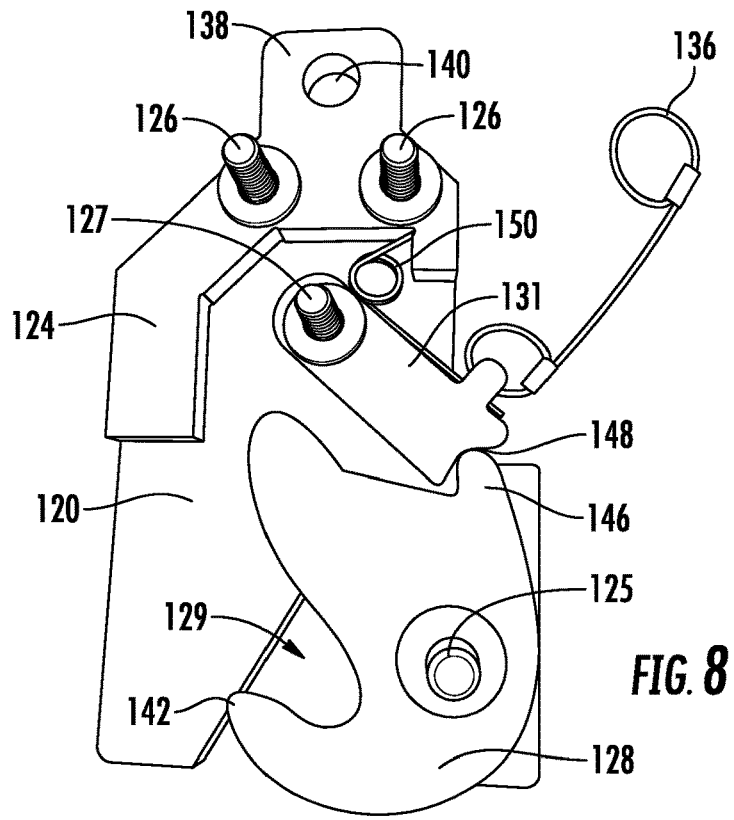
FIG. 8 is a view of the boat trailer latch of FIG. 7 after the U-shaped bolt is secured therein.

Referring now to FIG. 7, the bottom plate 122 has been removed from the latch 100 in order to describe the operation of the latching element 128 and the pawl 131. In particular, when the latch 100 is ready to be used for loading a boat, the latching element 128 is placed in an unlocked position. The release 136 is pulled so that the pawl 131 is not engaged with the latching element 128.

When the U-shaped bolt 104 of the boat 102 enters the V-notch 129, the U-shaped bolt 104 pushes on the latching element 128 causing it to begin to rotate clockwise (from a top perspective) about latching element pin 125. As the latching element 128 continues to rotate it closes behind the U-shaped bolt 104 using hook 142, and a tooth 146 of the latching element 128 engages a notch 148 of the pawl 131 so that the latching element 128 is prevented from rotating upward and counter-clockwise (from a top perspective). A spring 150 maintains the engagement of the pawl 131 and latching element 128. The latch 100 is now locked and securing a U-shaped bolt therein using the hook 142.

When a boat is to be launched, the release 136 is pulled and the latching element 138 is free so that it can rotate counter-clockwise and the U-shaped bolt 104 is no longer locked in the V-notch 129 of the latch 100 by hook 142. The boat 102 can then reverse its engines and back the boat 102 of the trailer into the water.

In another aspect, a method of manufacturing a boat trailer latch for use with a boat trailer and boat strap is disclosed. The method includes providing a top plate having a front portion and a rear portion, securing a bottom plate having a front portion and a rear portion to the top plate, and rotatably coupling a latching element having a tooth between the top and bottom plates and configured to rotate through the V-notch. In addition, the method includes positioning a pawl having a notch in order to selectively lock in the tooth of the latching element and prevent the latching element from rotating, securing a pair of adjustable brackets on opposing sides of the top and bottom plates, and forming a V-notch in the front portions of the top and bottom plates.

The latching element is configured to rotate in a first direction in response to a U-shaped bolt entering the V-notch so that as the latching element continues to rotate in the first direction the latching element closes behind the U-shaped bolt, and the tooth of the latching element engages the notch of the pawl so that the latching element is prevented from rotating in a second opposing direction and releasing the U-shaped bolt captured therein.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A boat trailer latch to be used with a boat trailer and strap, the boat trailer latch comprising:
   a top plate having a front portion and a rear portion;
   a bottom plate having a front portion and a rear portion complementary to the top plate;
   a notch formed in the front portions of the top and bottom plates;
   a latching element having a tooth, the latching element sandwiched between the top and bottom plates and configured to rotate through the notch;
   a pawl having a notch configured to lock in the tooth of the latching element and prevent the latching element from rotating; and
   a pair of brackets positioned on opposing sides of the top and bottom plates and the pair of brackets being adjustable forward or rearward relative to the notch;
   wherein the latching element is configured to rotate in a first direction in response to a boat bow hook entering the notch so that as the latching element continues to rotate in the first direction the latching element closes behind the bow hook, and the tooth of the latching element engages the notch of the pawl so that the latching element is prevented from rotating in a second opposing direction and releasing the bow hook.

2. The boat trailer latch of claim 1, further comprising a ring secured to the rear portions of top and bottom plates and the ring configured to receive a clasp from the boat strap to tighten the latch against the trailer.

3. The boat trailer latch of claim 1, further comprising a spacer sandwiched between the top and bottom plates, wherein the spacer creates a space for the latching element to rotate.

4. The boat trailer latch of claim 1, wherein the notch defined in the front portions of the top and bottom plates is configured to guide the bow hook into the notch.

5. The boat trailer latch of claim 4, wherein the notch is V-shaped.

6. The boat trailer latch of claim 5, wherein the pair of brackets comprise a plurality of apertures configured to make adjustments necessary for the bow hook to engage with the latch.

7. The boat trailer latch of claim 6, wherein each of the brackets is inclined relative to the top and bottom plates so that the pair of brackets are configured to rest flush against the trailer.

8. The boat trailer latch of claim 7, further comprising a release coupled to the pawl and configured to release the pawl so that the pawl is not engaged with the latching element.

9. The boat trailer latch of claim 8, further comprising a spring biased to maintain an engagement of the pawl and the latching element.

10. A boat trailer latch to be used with a boat trailer and strap, the latch comprising:
   a housing having a front portion and a rear portion;
   a V-notch formed in the front portion of the housing;
   a latching element rotatably secured within the housing and having a tooth on a first end and a hook on the second end; and
   a pawl having a notch configured to lock in the tooth of the latching element and prevent the latching element from rotating;
   wherein the latching element is configured to rotate in a first direction and the tooth of the latching element engages the notch of the pawl so that the latching element is prevented from rotating in a second opposing direction.

11. The boat trailer latch of claim 10, further comprising at least one bracket adjustably coupled to the housing and configured to engage a portion of a boat trailer.

12. The boat trailer latch of claim 11, further comprising a ring secured to the rear portion of the housing and the ring configured to receive a clasp from the boat strap, wherein the latch is configured to be secured to the boat trailer by reeling in the boat strap in order to tighten the latch against the trailer.

13. The boat trailer latch of claim 12, wherein the housing comprises a top plate and a complementary bottom plate.

14. The boat trailer latch of claim 13, further comprising a spacer sandwiched between the top and bottom plates, wherein the spacer creates a space for the latching element to rotate.

15. The boat trailer latch of claim 14, wherein the V-notch defined in the front portion of the housing is configured to guide a boat bow hook secured to a bow of the boat into the V-shaped notch.

16. The boat trailer latch of claim 15, wherein the bow hook is a U-shaped bolt.

17. The boat trailer latch of claim 16, wherein the at least one bracket comprise a plurality of apertures configured to make adjustments of an angle of the housing when secured to the boat trailer.

18. The boat trailer latch of claim 17, further comprising a release coupled to the pawl and configured to release the pawl so that the pawl is not engaged with the latching element.

19. The boat trailer latch of claim 18, further comprising a spring biased to maintain an engagement of the pawl and the latching element.

20. A method of manufacturing a boat trailer latch for use with a boat trailer and boat strap, the method comprising:
   providing a top plate having a front portion and a rear portion;
   securing a bottom plate having a front portion and a rear portion to the top plate;
   rotatably coupling a latching element having a tooth between the top and bottom plates and configured to rotate through the V-notch;
   positioning a pawl having a notch in order to selectively lock in the tooth of the latching element and prevent the latching element from rotating; and
   securing a pair of adjustable brackets on opposing sides of the top and bottom plates;
   wherein a V-notch is formed in the front portions of the top and bottom plates and wherein the latching element is configured to rotate in a first direction in response to a U-shaped bolt entering the V-notch so that as the latching element continues to rotate in the first direction the latching element closes behind the U-shaped bolt, and the tooth of the latching element engages the notch of the pawl so that the latching element is prevented from rotating in a second opposing direction and releasing the U-shaped bolt captured therein.

\* \* \* \* \*